United States Patent [19]
Dewey, Jr.

[11] 3,853,407

[45] Dec. 10, 1974

[54] MULTIPLE PATH SPECTROPHOTOMETER METHOD AND APPARATUS

[75] Inventor: C. Forbes Dewey, Jr., Belmont, Mass.

[73] Assignee: Sensoresearch Corporation, Lincoln, Mass.

[22] Filed: Apr. 23, 1973

[21] Appl. No.: 353,307

[52] U.S. Cl............... 356/189, 250/345, 250/353, 356/51, 356/93
[51] Int. Cl....................... G01j 03/48, G01n 21/34
[58] Field of Search........... 356/51, 95, 96, 189, 88, 356/93, 94, 95; 250/338, 343, 345, 347, 353

[56] References Cited
UNITED STATES PATENTS

| | | | |
|---|---|---|---|
| 2,118,837 | 5/1938 | Felton................................ | 356/207 |
| 3,661,462 | 5/1972 | Natens................................ | 356/51 |
| 3,694,086 | 9/1972 | May..................................... | 356/51 |
| 3,723,731 | 3/1973 | Blau, Jr............................... | 356/51 |

Primary Examiner—Vincent F. McGraw
Attorney, Agent, or Firm—Thomas N. Tarrant

[57] ABSTRACT

A multiple path spectrophotometer system is disclosed in which the beam from a radiation source is selectively directed over a plurality of different paths which may contain sample material or reference material and is detected by a single detector. The radiation source is operable to provide a beam at a plurality of alternately selectable wavelengths and the detector detects the absorption effects of material within the selected path. The method uses three sequential paths in which one path has negligible absorption, one has known selective absorption and one has unknown selective absorption to be determined.

7 Claims, 8 Drawing Figures

MULTIPLE PATH SPECTROPHOTOMETER METHOD AND APPARATUS

BACKGROUND OF THE INVENTION

1. Field of the Invention

The invention relates generally to spectrophotometry and in particular to multiple path spectrophotometry.

2. Description of the Prior Art

The property of individual chemical species to absorb radiation at selected wavelengths has historically been of great value in the analysis of homogeneous mixtures of several species. The ultraviolet and infrared regions of the spectrum are particularly useful in this analysis because all molecules containing more than one atomic species exhibit distinct spectral absorption patterns at these wavelengths. Commercial nondispersive infrared analyzers (NDIR analyzers) are typical instruments in which the presence of a specific species is determined by the absorption of radiation at selected infrared wavelengths.

It is readily apparent from an examination of the art that accuracy and repeatability in such measurements is difficult to achieve. Variations in the strength and spectral character of the optical source are common sources of error. Responses of detectors are subject to drift with time and temperature providing another source of error. In addition, several species present in the mixture may absorb radiation from the source.

Many methods have been adapted in an attempt to overcome these difficulties. To increase the specificity of instrument response to a particular chemical species, the radiation can be spectrally selected so that only particular wavelengths are incident on the detector. Thus, Harrison and Reid (J. A. Harrison and C. D. Reid, Journal of Scientific Instruments, Volume, 36, 1959, page 240), and Robinson (A. D. Robinson, Instruments and Control Systems, February 1963, pages 121–123), describe the use of infrared transmission filters to alternately select two wavelengths of analysis, one of which is absorbed by the subject species and one of which is unabsorbed by the mixture. Bartz and Ruhl (A. M. Bartz and H. D. Ruhl, Jr., Chemical Engineering Progress, Volume 64, Nov. 8, 1968, pages 45–49), describe the use of a dispersive grating system to achieve two alternate wavelengths. A more complicated dispersive optical system employing spectral correlation masks for identifying a particular chemical species is described by Barringer (A. R. Barringer, et al, U.S. Pat. No. 3,518,002). A different method for achieving selective response to the presence of a specific species is the use of an acoustic detector containing an infrared-absorbing gas (W. Fastie and A. H. Pfund, Journal of the Optical Society of America, Volume 37, 1947, page 762).

While the technique of using two wavelengths traversing a single optical path is advantageous in overcoming certain sources of instrumental errors and drift, other difficulties remain. For example, a single optical path does not allow calibration of the instrument except by flushing and filling the cell with a calibration mixture, or by artifically simulating the calibration mixture. (See, for example, U.S. Pat. No. 3,562,522 By C. N. Cederstrand, et al.) In an attempt to overcome this and other limitations, several instruments have incorporated two cells, one containing the sample to be analyzed, and a second representing a reference path. Various of these systems are described by D. W. Hill and T. Powell in their book Gas Analysis, Plenum Press, New York, 1968, and by A. M. Batrz and H. D. Ruhl on pages 398–434 of Applied Infrared Spectroscopy (D. N. Kendall, Editor), Reinhold Publishing, New York, 1966. Although of some value in overcoming instrumental errors and drift, these systems are all subject to one or more deficiencies, among which are the following:

1. Variations between different optical sources used for different optical paths.
2. Variations between different optical elements used for different optical paths.
3. Lack of adequate calibration references when the sample system contains an unknown concentration.
4. Variations in the spectral character or intensity of the light source.
5. The optical system requires expensive and complex components such as dispersive elements, sensitive acoustic detectors, or electronic circuits with precise compensation against drift.
6. The optical system is difficult to align and difficult to maintain in alignment because small dimensional changes produce changes in instrument readings.
7. Inefficient optical system resulting in a poor signal to noise ratio from the detector.
8. Contamination on the optical elements of the instrument produces measurement errors.

SUMMARY OF THE INVENTION

It is the general purpose of this invention to provide a simple and accurate method of measuring the absorption of radiation by a sample material. This is accomplished by such means as to substantially reduce errors arising from variations in the strength and spectral character of the optical source, changes in ambient and sample temperature, drifts in detector and electronics response and other effects such as those mentioned in the previous paragraph. The apparatus described herein is simple and low is cost, provides means for automatically calibrating the output with respect to zero and full scale, and possesses an efficient optical system which is easily aligned and insensitive to many types of imperfections in the optical elements.

The method according to the invention is a spectrophotometric process in which the two usual alternating narrow spectral bands filtered from the source are passed through a first neutral density channel, a second channel containing material having known absorption characteristics and a third channel containing material of unknown absorption characteristics. The intensity in each of the spectral bands is detected after passing through each channel to obtain six measured intensities. The six measurements are then processed to obtain information as to the absorption characteristics of the material in the third channel.

Novel spectrophotometers for performing the measurements according to the invention utilize a single illuminating source and a single detector and affix optical elements (which may include the detector) to a rotatable shaft for sequentially selecting three or more channels. Accordingly, it is an object of the invention to provide a novel method of spectrophotometry.

It is a further object of the invention to provide a method of spectrophotometry using three sequential channels to yield six pieces of measurement data.

It is a further object of the invention to provide a method of spectophotometry in which measurement in a nautral absorption channel is compared with measurement in a channel of known selective absorption and a channel of unknown selective absorption to determine absorption characteristics of the unknown.

It is still a further object of the invention to provide a spectrophotometer in which a single illuminating source and a single detector are used with a plurality of channels, the channels being selected by rotation of a shaft carrying optical elements.

Further objects and features of the invention will become apparent upon reading the following description together with the drawing.

DESCRIPTION OF THE PREFERRED EMBODIMENT

Figure 1:
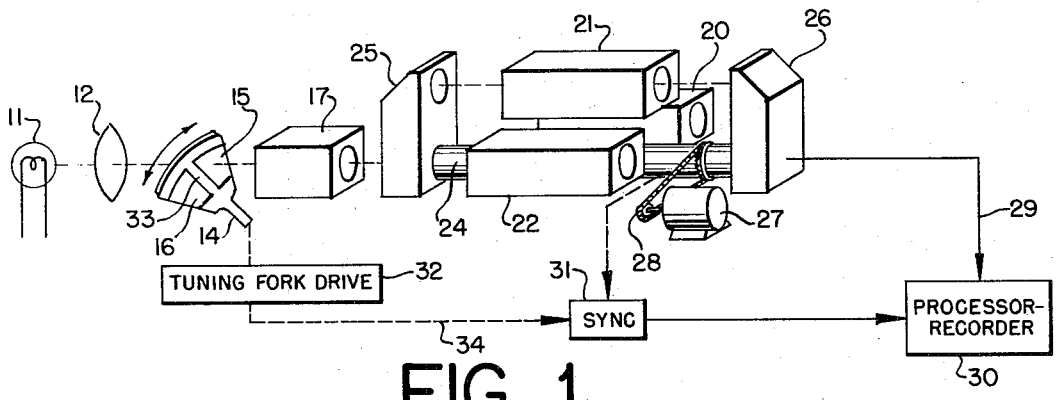
FIG. 1 is a diagrammatic illustration of a preferred embodiment of the invention.

Referring now to FIG. 1, a preferred embodiment of the inventive apparatus is depicted diagramatically including a light source 11, collector lens system 12 for collecting radiation from the source and wavelength selector 14, moveable in the light path from lens system 12 to select specific radiation wavelengths alternately. Wavelength selector 14 comprises two filter elements 15 and 16 for selecting in alternation two narrow spectral bands from source 11. Elements 15 and 16 are suitably multilayer laminated dielectric interference filters, but other usual types of filters may be used.

Additional fixed filter 17 may be used to modify the transmitted light. Filter 17 may typically be a gas filter and may be placed before or after selector 14 along the optical axis.

Following wavelength selector 14 and filter 17 are a plurality of cells, depicted as three cells 20, 21 and 22. Cells 20, 21 and 22 are adapted to contain unknown samples and calibration samples for various materials. Windows at opposite ends of the cells provide for transmission of illuminating energy.

Cells 20, 21 and 22 lie parallel with each other and are positioned at equal radial distances from shaft 24. Periscope optics 25 are connected at a first end of shaft 24 arranged to intercept source illumination passed by selector 14 and filter 17 and redirect it through a selected one of three channels containing cells 20, 21 and 22 respectively. Connected to the second end of shaft 24 is detector 26 aligned with the optical axis from periscope optics 25 through a selected channel. Detector 26 is a light detector such as commonly used in spectrophotometers.

Selection of a channel to be illuminated is by rotation of shaft 24. Periscope optics 25 and detector 26 are positioned on shaft 24 spaced at a distance greater than the length of cells 20, 21 and 22 and extend radially from shaft 24 for alignment with the cell windows.

Reversible motor 27 is connected to rotate shaft 24 through a belt or other suitable drive means to cause sequential illumination of cells 20, 21 and 22. Rotation of shaft 24 may readily be accomplished by mechanical, pneumatic, electromechanical, or manual activators.

Detector 26 is electrically connected to processor-recorder 30 by connecting lead 29. Processor-recorder 30 is suitably a small special purpose computer with an output recorder. Processor-recorder 30 functions to store and perform arithmetical functions on the signals received from detector 26.

Processor-recorder 30 requires information as to which of filters 15 and 16 correlates with a detector signal as well as which of cells 20, 21 and 22 is in the optical path. This information is fed to processor-recorder 30 by synchronizer 31.

Synchronizer 31, depicted as a separate component, may be incorporated in processor-recorder 30 and serves to identify measurement information from detector 26 with respect to the position of selector 14 and shaft 24. The "sync" signals to synchronizer 31 from selector 14 and shaft 24 may be provided in any usual manner.

Selector 14 is suitably mounted on a mechanically resonant element similar to a tuning fork. Tuning fork drive 32 provides magnetic impulses to maintain selector 14 in motion. Drive 32 may be phase synchronized to the motion of selector 14 by photodetectors (not shown). Filter elements 15 and 16 are separated by opaque strip 33. Two photodetectors positioned to respond to light from source 11 passing through selector 14 can detect both the interruption by strip 33 and the direction of motion. The output of these photodetectors can then synchronize drive 32 and further sync signal 34 to synchronizer 31 may be provided either by drive 32 or by the photodetectors.

The position of shaft 24 is readily determined by micro switches, some form of electrooptical system or other sensing arrangement. Some drive motors are position sensitive and can provide the sync information directly.

While FIG. 1 depicts a preferred embodiment, a critical feature is the use of rotatable shaft 24 which enables use of the same optical components for a pluraliry of channels. The optics associated with shaft 24 may take several configurations.

Figure 2:
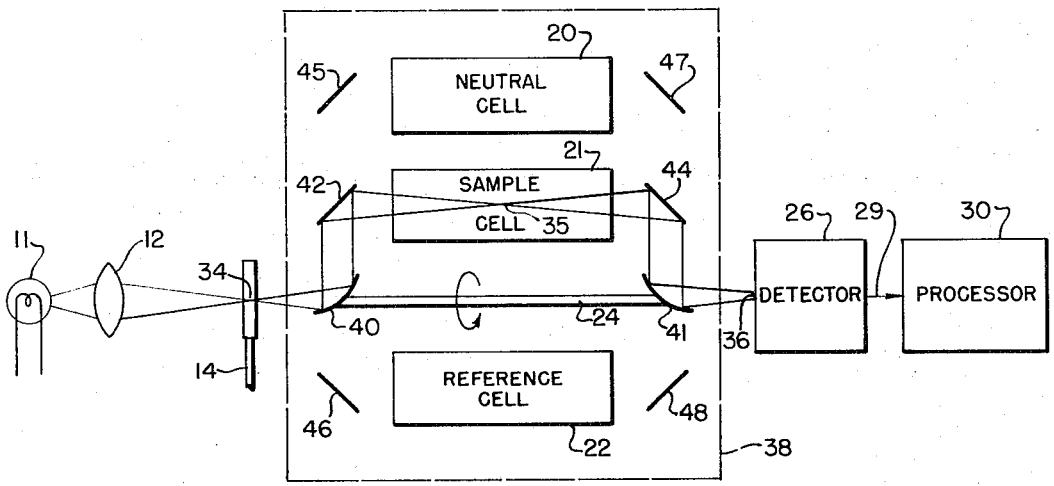
FIG. 2 is a schematic diagram, partially in block form, of a second embodiment of the invention.

In FIG. 2 corresponding components have the same reference numerals as in FIG. 1. Shaft 24 in the embodiment of FIG. 2 has concave mirror 40 facing selector 14 at one end and concave mirror 41 facing detector 26 at the other end. The concave mirrors are curved to provide focus 35 at the center of the selected channel and focus 36 at detector 26. Further mirrors 42, 44;

45, 47; and 46, 48; coact with mirrors 40 and 41 to provide two sets of periscope optics for each selected channel. With cells 20, 21 and 22 positioned radiaally equidistant around shaft 24 one set of periscope optics displaces the optical axis to the axis of the selected channel and the second set displaces the optical axis back in alignment with shaft 24. In this configuration detector 26 is preferably fixed in alignment with shaft 21. If desired, detector 26 can be place elsewhere with suitable optics to direct the optical path to it.

In FIG. 2 mirrors 42, 44, 45, 47, 46 and 48 are each in fixed positions associated with cells 20, 21 and 22.

It is desirable in all embodiments to attain high optical efficiency by focusing the source at critical points. Thus in FIG. 2, lens 12 focuses source 11 to intermediate focus 34 at selector 14. A further intermediate focus 35 is provided in the center of a selected channel and a final focus is at detector 26. Additional foci may be desirable and in any case may be obtained by lenses as well as curved mirrors.

It will be understood that cell 20 in FIG. 2 is the same radial distance from shaft 24 as are cells 21 and 22, but is not depicted at the same distance due to limitations of schematic illustration.

Figure 3:
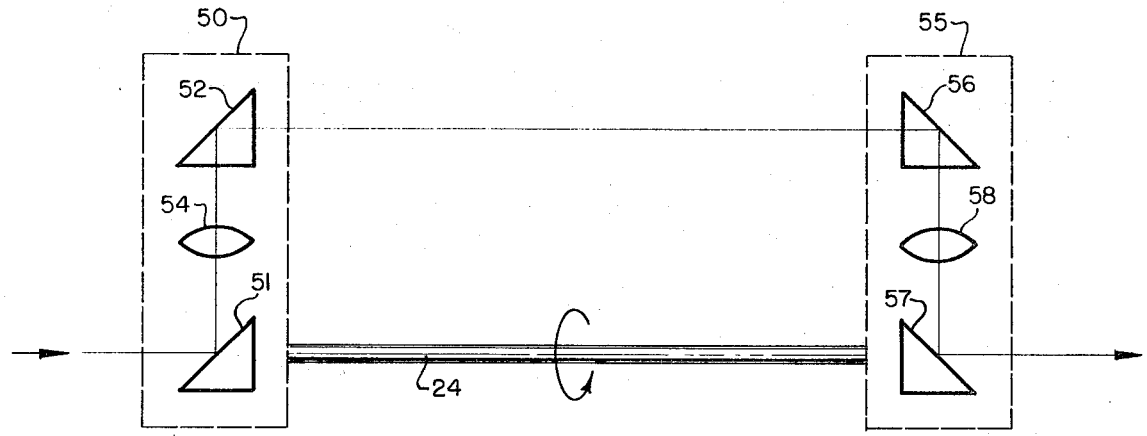
FIG. 3 is a schematic diagram showing an alternative embodiment of the optical path selecting components of FIG. 2.

Selector assembly 38 is indicated by a dashed outline in FIG. 2 and includes the plural paths and optical path selector means. In FIG. 3 only the optical path selector is depicted in a further alternative configuration.

Periscope optics 50 comprises two prisms 51 and 52 and lens 54 for providing intermediate focus 35 (see FIG. 2). Periscope optics 55 comprises two prisms 56 and 57 and lens 58 providing final focus 36 (see FIG. 2). Both periscope optics 50 and 55 are connected rigidly to shaft 24 and rotate therewith.

Figure 4:
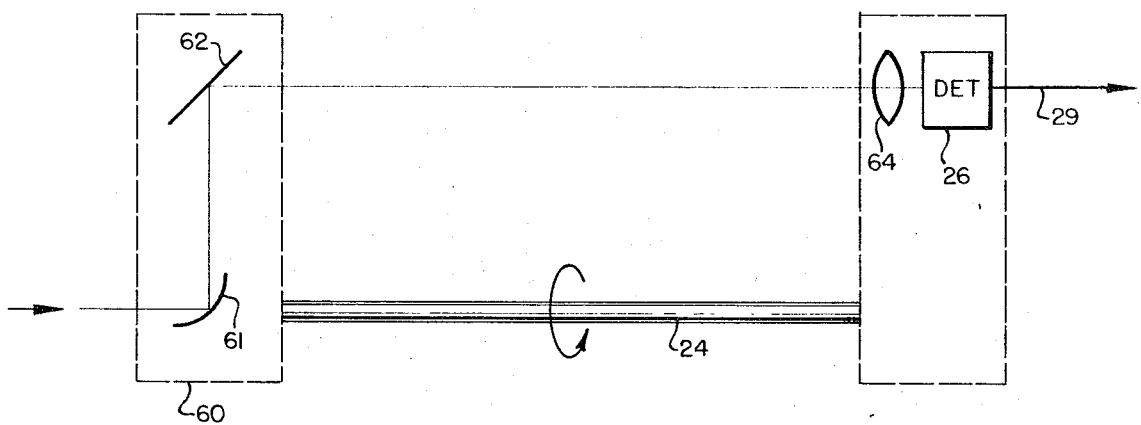
FIG. 4 is a schematic diagram of optical path selecting components of FIG. 1.

FIG. 4 likewise depicts an alternative embodiment of the optical path selector. In this embodiment detector 26 is mounted on the path selector mechanism as in FIG. 1. Periscope optics 60 connected to a first end of shaft 24 comprises a curved mirror 61 and a flat mirror 62. Curved mirror 61 combines the functions of prism 51 and lens 54 of FIG. 3. Facing mirror 62 and mounted from the oppposite end of shaft 24 is detector 26. Lens 64 mounted with detector 26 focuses incident illumination on detector 26. Connecting lead 29 from detector 26 is flexible to allow for movement of the path selector mechanism.

Figure 5:
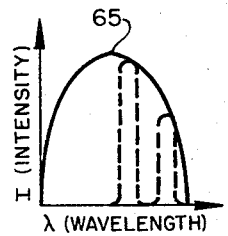
FIG. 5 is a graph of intensity versus wavelength of a typical illuminating source.
Figures 6, 7:
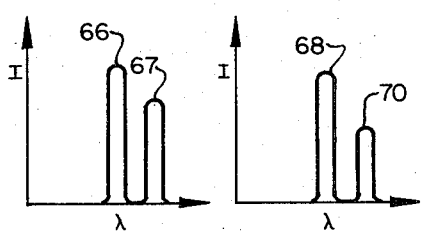
FIG. 6 is a graph showing intensity versus wavelength for two narrow spectral bands selected from the source of FIG. 5 measured through a channel having negligible absorption.
FIG. 7 shows intensity versus wavelength of the same two bands measured through a channel having unknown absorption.
Figure 8:
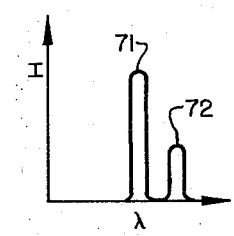
FIG. 8 is a graphical illustration of intensity versus wavelength showing measurement through a channel of known absorption.

To illustrate the use of the invention in measuring the concentration, C, of the chemical species placed in sample cell 21, reference is made to FIGS. 5 to 8. Curve 65 of FIG. 5 represents the broad spectral character of the radiation emitted by source 11, which may typically be an incandescent filament. Curves 66 and 67 of FIG. 6 represent the intensities $A_o$ and $B_o$ of radiation at two selected wavelengths $\lambda_A$ and $\lambda_B$ which are passed by wavelength-selective elements 14 and 17 of FIG. 1. The two wavelengths are chosen in such a way that radiation of wavelength $\lambda_B$ is absorbed by the measured species and $\lambda_A$ is not absorbed by the measured species. Curves 68 and 70 of FIG. 7 illustrate the intensities $A_s$ and $B_s$ of radiation passing through sample cell 21, wherein the intensity of $\lambda_B$ is reduced as the concentration of the measured species in sample cell 21 is increased. Curves 71 and 72 of FIG. 8 illustrate the attenuation produced by a fixed reference concentration, $C^*$, of the measured species placed in reference cell 22. By sequentially selecting optical paths through cells 20, 21 and 22, and by using wavelength-selective elements 15 and 16 to alternately pass radiation of different selected wavelengths along each of the paths, six independent signals are derived from the single 26. These six signals can be used to determine the species concentration in the sample cell.

While the accuracy of the inventive method has been proven empirically, the following theory may help by way of explanation. It is not intended as limiting on the invention or as essential to the performance of the invention, but only as the presently believed theory of operation.

The transmittance of radiation at any specific wavelength by given chemical species in a solution of fixed thickness will be a monotonically decreasing function of species concentration. The transmittance can be determined by comparing the intensity of nonabsorbed radiation with absorbed radiation. Variations in the functional relation between transmission and concentration can arise if the selected bad of radiation is not precisely monochromatic; further, the specific absorption co-efficient of the chemical species may change with the pressure of the mixture (if a gas) or the nature of the solvent (if a liquid). While many of these observed effects have received adequate explanation in the literature pertaining to spectrometry, they are often most easily and accurately determined by experiment. In the subsequent discussion, we shall discuss only the simplified case where the decrease in transmittance is directly proportional to the concentration of the chemical species to be measured. Similar explanations may be easily formulated for more complicated laws of absorption.

The two spectral bands selected for alternation are defined as first band, A and second band, B. $A_o$ is the intensity of band A, and $B_o$ is the intensity of band B, as measured by the detector, when the radiation passes through the neutral cell. $A_s$ is the measured intensity of band A transmitted through a sample of unknown concentration and $B_s$ is the measured intensity of band B through the same sample. $A_r$ is the measured intensity of band A transmitted through a reference of known concentration and $B_r$ is the measured intensity of band B transmitted through the same reference. It is assumed A is selected for negligible absorption and B is absorbed by the species being measured.

The concentration of the sample will be related to the ratio of the measured energy of band A with respect to B. However, differences in the source intensity for the two bands produces an inaccuracy. By subtracting the ratio $B_s/A_s$ from the ratio $B_o/A_o$ and similarly subtracting the ratio $B_r/A_r$ from $B_o/A_o$ a compensated measure of transmittance is achieved.

Now the ratio of the unknown concentration, C, to the known concentration in the reference cell, $C^*$, can be accurately determined by the equation:

$$(C/C^*) = (B_o/A_o - B_s/A_s)/(B_o/A_o - B_r/A_r) \quad (1)$$

$C^*$ is known and the six quantities on the right side of the equation are all measured. Multiplying by $C^*$:

$$C = C^*[(B_o/A_o - B_s/A_s)/(B_o/A_o - B_r/A_r)] \quad (2)$$

Since all figures are used as ratios of intensity in the two spectral bands utilized, it will be recognized that uniform absorption such as with a neutral filter will have no effect on the equation. Some neutral filtering may be desirable for operating the detector in a given range. Dirt or dust on the optical components also operates as harmless neutral filtering.

A system has been constructed according to the teachings of this invention in which many of the advantages described herein have been realized. A small nichrome filament, electrically heated to approximately 500°C, was used as optical source 11. A spherical mirror was used as the lens system 12 for collecting radiation from the source, and a mechanical tuning fork mounted with two multilayer dielectric interference filters was used as the wavelength-selecting means 14. Three cylindrical tubes, 20 cm long and 2.5 cm in diameter, were used as cells 20, 21 and 22. Sodium chloride windows were used on all cells. A pyroelectric detector was employed as detector 26. The selector mechanism was composed of a single shaft 24 mounted in ball bearings and having attached to its mirrors performing the functions of periscope optics 50 and 55 of FIG. 3. The output of the detector was read by an oscilloscope synchronized to the tuning fork. An infrared-absorbing gas at a measured concentration, $C^*$, was placed in reference cell 22, and the same gas at varying concentrations, $C$, was placed in sample cell 21. Neutral cell 20 was open to the atmosphere.

The output signals were read off the oscilloscope and processed in accordance with equation (1) by manual computations to obtain a computed ratio. At low concentrations $C$ and $C^*$, this computed ratio was found to be accurately related to the actual ratio $(C/C^*)$. For concentrations $C$ for which substantial absorption was observed, the relation between concentration and the output signals was found to follow the form:

$$C = C^*[\ln(B_o/A_o) - \ln(B_s/A_s)/\ln(B_o/A_o) - \ln(B_r/A_r)] \quad (3)$$

Where the symbol $ln(x)$ is the natural logarithm of $x$. Substantial changes in the optical power of the source, as well as changes in its spectral distribution, were observed to have a negligible effect on the value of the computed ratio for a fixed concentration. Similarly, the value of the computed ratio was insensitive to severe degradation of the salt windows which occurred because of exposure to high humidity. Further, a test was performed to simulate changes in the spectral response of the detector, with the result that the computed ratio remained excellently correlated with the known concentration ratio $(C/C^*)$.

More than three paths may be used for the purpose of providing additional calibration paths, for measuring the concentration of more than one species or more than one sample of the same species, or for other purposes. The wavelength-selective elements may employ means for selecting more than two wavelengths, as for example in the circumstance where it is desired to measure the concentration of more than one molecular species in the sample. Further, the cells may be rotated sequentially into the optical path, the optical path remaining fixed in space. Many other variations and modifications may be made and will be apparent to those skilled in the art without departing from the scope of the invention as defined in the appended claims.

I claim:
1. A method of spectrophotometry comprising:
   a. Placing a material exhibiting substantially spectrally uniform light absorption in a first channel of a spectrophotometer;
   b. placing a material having a negligible absorption of a predetermined first spectral band and known absorption of a predetermined second spectral band in a second channel of said spectrophotometer;
   c. placing a material having negligible absorption of said first spectral band and unknown absorption of said second spectral band in a third channel of said spectrophotometer;
   d. illuminating said channels sequentially with alternations of said first and second spectral bands; and
   e. detecting the illumination intensity passed by each channel in sequence so as to obtain information indicative of the nature of the material in said third channel.

2. A method of spectrophotometry according to claim 1 wherein said illuminating and detecting are all performed with a single light source and a single detector.

3. A method of spectrophotometry according to claim 1 further comprising processing said information to determine the concentration of a particular molecular species in the material placed in said third channel.

4. A method of spectrophotometry according to claim 3 in which said processing comprises solving the equation:

$$C = C^*[B_o/A_o - B_s/A_s/B_o/A_o - B_r/A_r]$$

Where $C$ is the concentration of the particular molecular species in the material placed in said third channel; $C^*$ is the known concentration in said second channel; $A_o$ is the first spectral band intensity detected from said first channel; $B_o$ is the second spectral band intensity detected from said first channel; $A_r$ is the first spectral band intensity detected from said second channel; $B_r$ is the second channel; $B_r$ is the second spectral band intensity detected from said second channel; $A_s$ is the first spectral band intensity detected from said third channel; and $B_s$ is the second spectral band intensity detected from said third channel.

5. A method of spectrophotometry comprising:
   a. Operating an illuminating source to provide alternations of a first spectral band and a second spectral band;
   b. measuring the intensity of light from the illuminating source to obtain a comparison of the energy in said first and second spectral bands;
   c. passing the filtered light through a first material having known absorption of said first spectral band and negligible absorption of said second spectral band;
   d. measuring the light intensity passed through said first material to obtain a comparison of the energy transmitted in said first and second spectral bands;
   e. passing the filtered light through a second material having unknown absorption in said first spectral band and negligible absorption in said second spectral band;
   f. measuring the light intensity passed through said second material to obtain a comparison of the energy transmitted in said first and second spectral bands; and, g. processing the three comparisons obtained in the preceding steps to determine the nature of said second material.

6. A spectrophotometer comprising:
a. a single light source;
b. a plurality of analysis channels;
c. a rotatablle shaft positioned radially equidistant from each of said channels;
d. first optical means mounted on one end of said shaft to selectively direct light from said source through said analysis channels;
e. a single photodetector mounted on the opposite end of said shaft;
f. second optical means mounted on said opposite end of said shaft to selectively intercept light from an analysis channel and bring it to a focus on said photodetector;
g. a wavelength selector for selecting in alternation two spectral bands from said light source and transmitting the selected bands to said first optical means; and,
h. third optical means for bringing light from said light source to a focus at said wavelength selector; said first optical means being further characterized in that it brings light from said source to a focus in the selected analysis channel.

7. A spectrophotometer according to claim 6 further comprising means to drive said shaft in rotation whereby said light is sequentially directed through each of said analysis channels.

* * * * *